3,459,443
TAMPERPROOF COUPLING
Lamont Chester Butters, Lowell, and George Burchard Horne, Ipswich, Mass., assignors to Watts Regulator Co., Lawrence, Mass., a corporation of Massachusetts
Filed Feb. 1, 1967, Ser. No. 613,231
Int. Cl. F16l 35/00, 55/00
U.S. Cl. 285—39      5 Claims

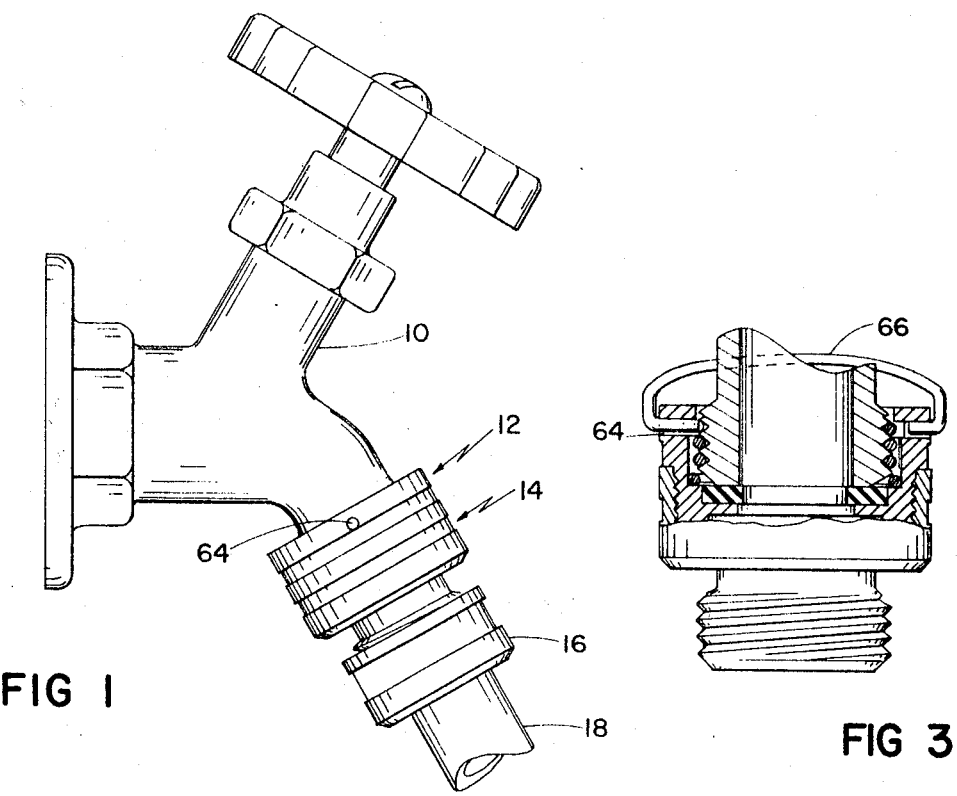
FIG 1
FIG 3
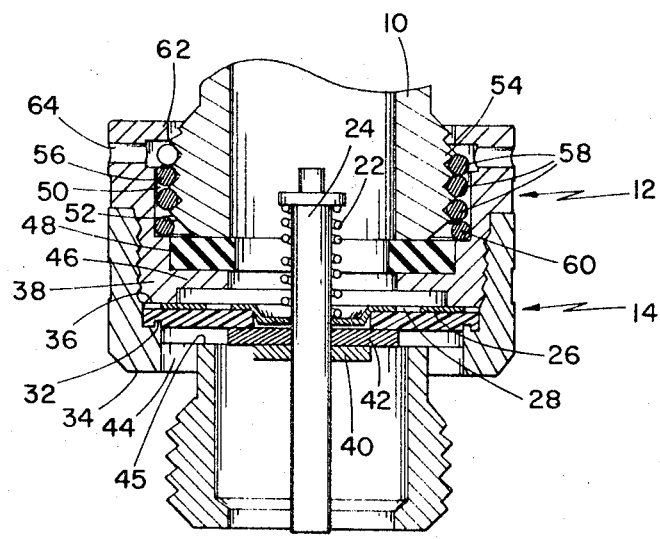
FIG 2

ABSTRACT OF THE DISCLOSURE

A coupling device comprising a coil in an open round hole of a connecting member. The coil includes a braking turn, further away from the mouth of the hole than some other turns, and the connecting member includes a stop preventing release of the coil from the round hole but allowing entrance of a male threaded member into the round hole through the mouth.

---

This invention relates to coupling structures so that they may not be separated or separated only with the aid of an additional releasing instrument.

The primary object of the invention is to provide tamperproof coupling. Other objects are to accomplish this with simplicity, reliability and in an inexpensive form.

The invention features a coil in an open hole, round in cross-section, of a connecting member, in axial alignment therewith, disposed toward a male threaded member, with a braking turn of the coil, further away than some other turns of the coil from the mouth of the hole, in tight fitting engagement with the wall of the round hole, and a stop preventing the release of the coil from the round hole but allowing entrance of the male threaded member into the round hole, through the mouth, or thread introduction end, of the hole, for mating engagement with the coil. In preferred embodiments, the round hole has a cylindrical wall, the braking turn of the coil is at the base of the hole and has an outside diameter larger than that of the other coil turns, the stop is an annular lip at the thread introduction end of the hole, extending inwardly, having an inside diameter smaller than the outside diameter of the coil, and there is a release hole extending from the wall of the round hole to the outside wall of the connecting member to allow the insertion of a rod to abut the face of the coil end nearest the thread introduction end of said round hole.

Other objects, features and advantages will appear from the following description of a preferred embodiment of the invention, taken together with the attached drawings thereof, in which:

FIG. 1 is a side elevation of a preferred embodiment of the invention;

FIG. 2 is a vertical sectional view thereof, slightly enlarged; and

FIG. 3 is a vertical view thereof, partially in section, slightly enlarged, showing a bail in position.

There is shown in the drawings a sill cock 10, the coupling device of the invention (indicated generally at 12), an anti-siphon backflow preventer (indicated generally at 14), a hose fitting 16, and a hose 18.

In general, the coupling device of the invention forms the upper part (indicated genreally at 12) of the structure of FIG. 2, and the anti-siphon backflow preventer the lower part (indicated generally at 14).

The anti-siphon backflow preventer includes a spring 22 loaded disc guide 24 with the spring resting on a nonresilient pressure plate 26 which has holes 28 through which water may flow. A resilient diaphragm 30 has outer edges which together with the outer edge of the pressure plate plate 26 are held firmly between a ridge 32 of the female connector 34 and the lower edge 36 of the connector 38. A disc holder 40 is attached to the disc guide 24 and supports a resilient disc 42.

When force owing to water pressure in the upstream end of the device is greater than the spring 22 force plus that owing to the wtaer pressure in the downstream end, the disc holder 40 and disc 42 move down with the disc guide 24, the inner edges of the resilient diaphragm 30 move down to a lesser extent, and water passes through the holes 28 of the pressure plate 26 and between diaphragm 30 and disc 42 from the upstream to the downstream side. Ventilating ports 44 keep the downstream cavity of the anti-siphon backflow preventer open to atmospheric pressure when its parts are as shown in FIG. 2 but when the water pressure upstream increases to the extent mentioned and the edges of the diaphragm 30 move down, the diaphragm in cooperation with ridges 45 seals off the ports.

A ridge 46 of the connector 38 supports a resilient hose washer 48.

Above the hose washer 48 is cylindrical wall 50 defining a round hole 52. Inside the round hole 52 are located the threaded portion 54 of the sill cock 10 and a coil 56, its axis common with that of the round hole 52, with turns 58 wound to match the sill cock's threads but not to engage the cylindrical wall 50 and a braking turn 60 of larger outside diameter which is in tight fitting engagement with the cylindrical wall 50 at the base of the round hole 52.

A stop in the form an annular lip 62 at the thread introduction end of the round hole 52 has an inside diameter larger than the outside diameter of the sill cock's threaded portion 54 and smaller than the outside diameter of the turns 58 of coil 56.

Release holes 64 extend from the round hole 52 to the outside wall of the connector 38.

In operation, the sill cock 10 and the connecting member 38 are originally unconnected. The coil 56 is prevented from leaving its position in the round hole 52 by the stop 62.

To couple the connecting member 38 to the threaded portion 54 of the sill cock, the connecting member is placed on the edge of the threaded portion and turned in the same manner as a female threaded part. The upper turns 58 of the coil 56 grasp the threads of the threaded portion 54 of the sill cock. The friction between the braking coil turn 60 and the cylindrical wall 50 in which it is in tight fitting engagement is such that the rotation of the connecting member 38 is transmitted to the coil 56. The coil 56 is so wound that this rotation tends to unwind the coil slightly and make the coil track freely into the male threads of the sill cock, in the same manner as any threaded part, until the connection is complete.

When an attempt is made to disengage the connecting member 38 from the sill cock by rotating the connecting member 38 the opposite way, friction between the braking turn 60 and the cylindrical wall 50 causes a force on the coil 56 that, with that from the threads, tends to wind it, causing the coil turns 58 to grasp the threaded portion 54 yet more firmly. The frictional force opposing motion of the coil turns 58 with respect to the threaded portion 54 increases to a point where further rotation of the connecting member 38 causes the braking coil turn 60 to slip with respect to it. Thus the connecting member 38 merely rotates around the coil 56 with no disengagement occurring between the coil 56 and the threaded portion 54.

Because the stop 62 prevents axial movement of the connecting member 38 with respect to the coil 56, uncoupling cannot be accomplished without destruction of the device unless the coil 56 can be caused to turn with the connecting member 38 when it is rotated.

A releasing instrument in the form of a bail 66 is shown in FIG. 3. Its ends are placed in the release holes 64 of the connecting member 38 and the member is rotated until one end of the bail 66 abuts the end of the coil 56, so that when the connecting member is rotated still more the coil will rotate with it and track out of the male thread in the same manner as any threaded part.

Other embodiments will occur to those skilled in the art.

What is claimed is:

1. A coupling device comprising:
   a connecting member,
      said connecting member including a wall portion defining a hole round in cross-section, at least a portion of which has a cylindrical surface,
   a coil,
      said coil being disposed in said round hole and having its axis common therewith
         said wall portion defining said round hole including a thread introduction end,
      said coil including a braking turn tightly frictionally engaging the interior cylindrical surface of said hole spaced from said thread introduction end and at least one other turn of smaller outer diameter than the inside diameter of and freely rotatable within said hole intermediate said braking turn and said thread introduction end,
   whereby said frictional engagement between said braking turn and said cylindrical surface holds said coil substantially stationary with respect to said connecting member when said device is rotated in one direction relative to a male threaded member to thread said male member into mating engagement with said coil and permits rotation of said coil relative to said connecting member when said device is rotated in the other direction relative to said male member to prevent said male member from being threaded out of engagement with said coil,
   and a stop,
      said stop being carried by said connecting member and positioned relative to said coil to prevent axial movement thereof through said thread introduction end,
   whereby the release of said coil from said round hole is prevented but the entrance of said male threaded member into said round hole for mating engagement with said coil is permitted.

2. The device of claim 1 wherein said connecting member includes a releasing portion for holding the coil stationary with respect to said connecting member.

3. The device of claim 1 in which a portion of said connecting member defines a release hole extending through the wall thereof whereby a releasing instrument may be inserted through said release hole to abut at least a portion of the face of the end of said coil closest said thread introduction end and hold the coil stationary with respect to said connecting member.

4. The device of claim 1 in which said stop is an annular lip at said thread introduction end, said lip extending inwardly and having an inside diameter smaller than the outside diameter of said coil.

5. A coupling device comprising:
   a connecting member,
      said connecting member including an outside wall and a portion defining a round hole with a cylindrical wall,
   a coil,
      said coil being disposed in said round hole and having its axis common therewith,
         said round hole including a thread introduction end
      said coil including a braking turn and at least one other turn, said braking turn being at the end opposite said thread introduction end of said cylindrical hole and having an outside diameter larger than that of the other turns of said coil, said braking turn being in tight frictionally fitting engagement with said cylindrical wall, said cylindrical wall which is in engagement with said braking turn being circumferentially continuous and an annular lip at the mouth of said hole,
         said lip extending inwardly and having an inside diameter smaller than the outside diameter of said coil
   said connecting member including a portion defining a release hole, said release hole being axially transverse to the axis of said cylindrical hole and extending from said cylindrical hole adjacent the end turn of said coil closest to said round hole thread introduction end through the outside wall of said connecting member.

References Cited

UNITED STATES PATENTS

| | | |
|---|---|---|
| 2,022,946 | 12/1935 | Staempfli. |
| 2,138,919 | 12/1938 | Herman. |
| 2,997,054 | 8/1961 | Woodford _____ 285—355 X |
| 3,272,250 | 9/1966 | Hattan. |

FOREIGN PATENTS 684,832  12/1952  Great Britain.

CARL W. TOMLIN, Primary Examiner

D. W. AROLA, Assistant Examiner

U.S. Cl. X.R.
85—32; 285—92, 318